Figure 1:
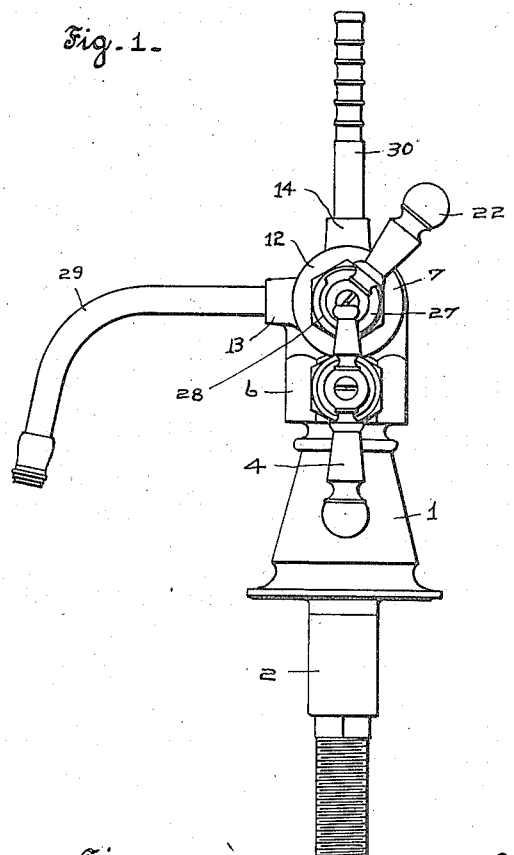

I. W. LITTLE.
TWO-WAY OUTLET FOR HOT AND COLD WATER FAUCETS.
APPLICATION FILED DEC. 16, 1910.

1,160,627.

Patented Nov. 16, 1915.
2 SHEETS—SHEET 1.

Witnesses
Orville F. Bollinger
Charles H. Thompson

Inventor
Irving W. Little
By Herman H. Martin
Attorney

I. W. LITTLE.
TWO-WAY OUTLET FOR HOT AND COLD WATER FAUCETS.
APPLICATION FILED DEC. 16, 1910.
1,160,627.
Patented Nov. 16, 1915.
2 SHEETS—SHEET 2.
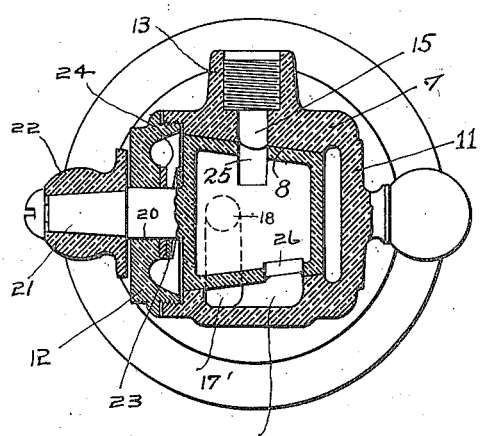
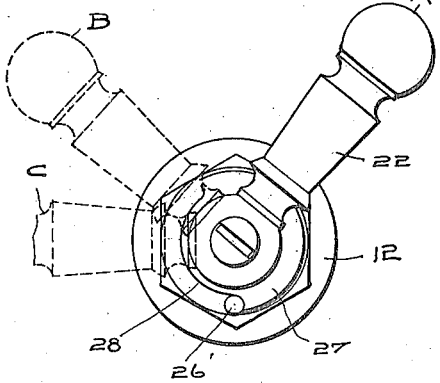
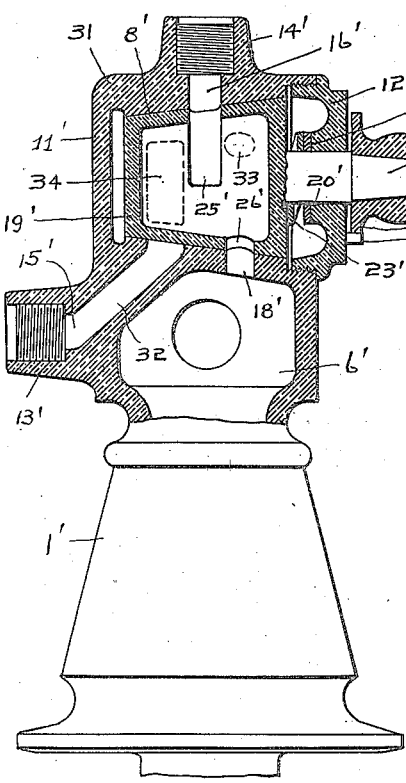
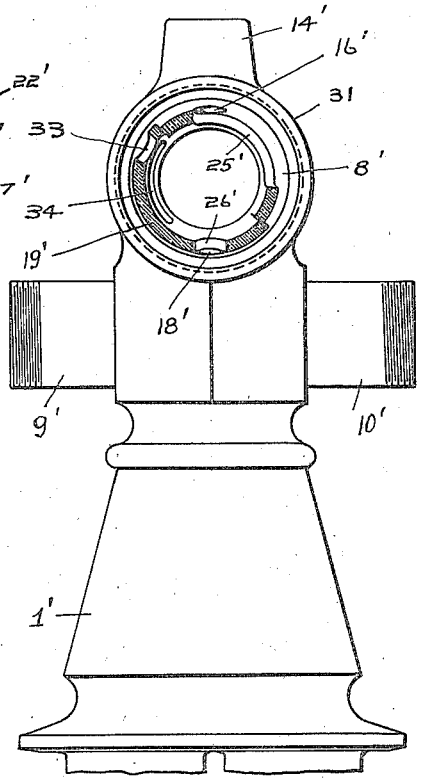
Witnesses—
Orville F. Bollinger
Charles H. Thompson
Inventor—
Irving W. Little
By Norman H. Martin
Attorney

UNITED STATES PATENT OFFICE.

IRVING W. LITTLE, OF TOLEDO, OHIO.

TWO-WAY OUTLET FOR HOT AND COLD WATER FAUCETS.

1,160,627.

Specification of Letters Patent.

Patented Nov. 16, 1915.

Application filed December 16, 1910. Serial No. 597,686.

*To all whom it may concern:*

Be it known that I, IRVING W. LITTLE, a citizen of the United States, and residing at Toledo, in the county of Lucas and State of Ohio, have invented a new and useful Two-Way Outlet for Hot and Cold Water Faucets, of which the following is a specification.

My invention relates to hot and cold water faucets and has for its object to provide this kind of plumbing fixtures with a two-way-outlet from their mixing chamber, said two-way-outlet being provided with a valve, which is so ported, that water from the mixing chamber may be discharged through one or the other of the two outlets, or that the outflow of water from the mixing chamber may be cut off, without closing of the relative adjustment of the hot and cold water valves to the mixing chamber and that the two-way-outlet valve may be turned as to locate its ports to drain the outlets.

The objects of my invention are accomplished as hereinafter described and illustrated in the drawings in which—

Figure 2:
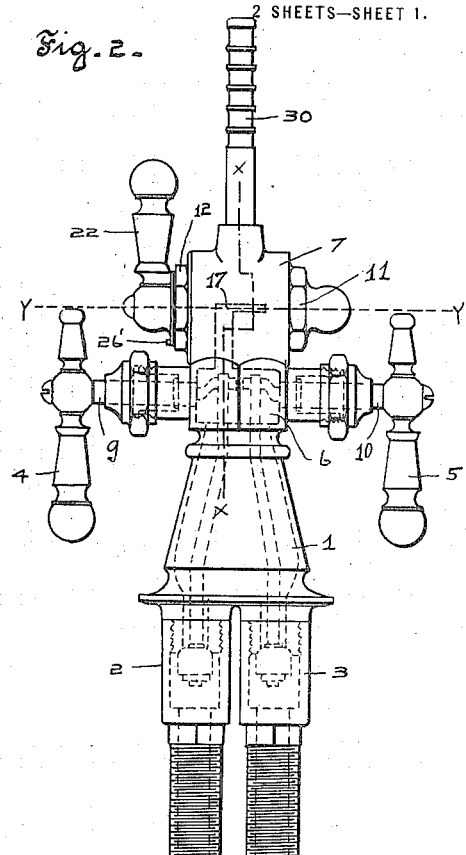
Figure 3:
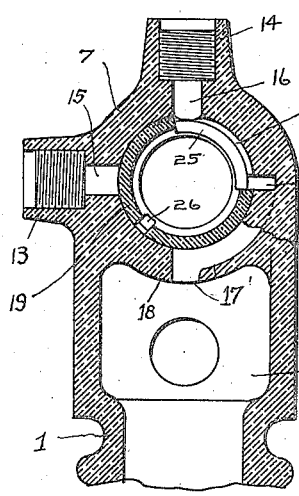
Figure 4:
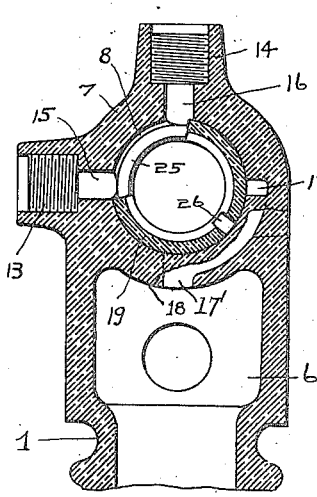
Figure 5:
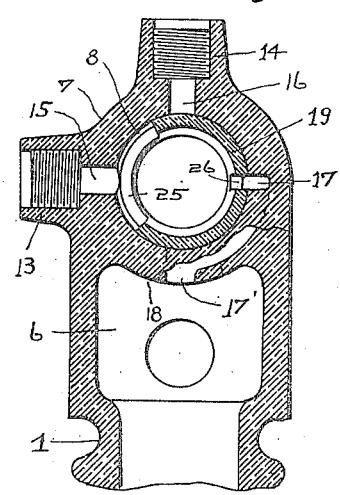

Figure 1 is a side elevation of a hot and cold water faucet having my two-way-outlet. Fig. 2 is a rear view of the same showing the water channel in my valve body in dotted lines. Fig. 3 is a section on line *x x* of Fig. 2 showing the valve parts so placed as to permit discharge of water through the vertical outlet. Fig. 4 is a like view on line *x x* but the valve parts are so placed as to register the outlets for drainage and in which position, the supply port from the mixing chamber is closed. Fig. 5 is also a section on line *x x* but showing the valve turned to locate its ports as to permit discharge of water through the lateral or basin outlet. Fig. 6 is a section in the horizontal plane on line *y y* of Fig. 2. Fig. 7 is a side elevation of the valve-chamber-closure showing the stop controlling the movement of the handle, the position of the handle corresponding with the position of the valve ports, as shown in Fig. 3 being in solid lines and the other positions of the handle are indicated in dotted lines. Fig. 8 is a modified form of pedestal partly in elevation and partly in section, showing the distributing valve arranged to the rear of the lower outlet and being above the mixing chamber. Fig. 9 is a rear elevation of the same showing the valve in section the valve ports being in position to permit discharge of the water from the mixing chamber from the vertical outlet.

The pedestal 1 of the fixture shown in Figs 1–7 inclusive, has a cold water supply 2 and a hot water supply 3, both of which are valved and are controllable by means of individual handles 4 and 5 respectively, and the interior of said pedestal serves for a chamber 6 in which cold and hot water are mixed. The casing 7 of my valve, as shown in said figures is an integral part of the pedestal, being imposed above the top of the mixing chamber, and the axis of the bore 8 in the casing is arranged in line with the axis of the hot and cold water valve-mandrels 9 and 10. The casing 7 is provided with end closures of which, the end 11 may be integral with the body of the casing and the end closure 12 is suitably thread-coupled thereto. The casing is further provided with socket-bosses 13 and 14 which are internally threaded and of which, the boss 13 is disposed in lateral position and boss 14 projects vertically from the casing, both bosses being also central with the axis of the pedestal and which axis is at right angles to the axis of the valve mandrels. The bosses 13 and 14 are provided respectively with ports 15 and 16, both of which extend through the wall of the casing into its bore. The bore 8 is scored by a groove 17, which in the form of an inverted letter L, has its lateral portion disposed diametrically opposite the outlet-port 15 and its vertical portion, located near the open end of the casing and intersects at its bottom end a port 17' through the division wall 18 between the casing bore and the mixing chamber. The casing bore 8 is adapted to revolubly receive a distributing valve comprising a hollow valve-body 19 which is of the form of a truncatded cone. The end closure 12 is provided with a central bore 20, to receive the valve-stem 21, which latter is provided with a suitable handle 22 at the outside of the closure cap 12. The valve 19 is held in position, by means of a spring 23 which is interposed between the valve body and the closure-cap and bearing upon a washer 24 which is interposed between the closure-cap and one end of the spring. The valve body is made preferably hollow and is provided with a slot-like port 25, its length being about 90° of the circumference of the valve-body. The opposite wall of the valve-body is also pierced to provide a port 26 of lesser length, being disposed opposite the central portion of the port 25 and near the small end of the valve body, the portion of the valve body which separates the ports being of sufficient width to prevent said port 26 intersecting the up-take groove 17', where the handle 22 is turned to the position B. The relative position of the port 25 and the port 26 to the handle 22 is shown in Figs. 1 and 3 and also in Fig. 7 in which the position of the handle is shown in solid lines at A, and so locating the quadrant port as to establish a passage for water through the vertical port 16 and consequently closing the outlet port 15. When the handle is brought to B, the quadrant port is rotated about 90°, whereby the flow of water into the hollow-body of the valve is cut off and the outlet-port 16 is connected with the outlet-port 15 thereby permitting draining of said port 16 and its connections. When the handle is brought to C the vertical outlet port 16 is closed and the quadrant-port 25 being disposed opposite the outlet port 15 the valve port 26 is brought to register with the lateral portion of the groove 17 whereby, water is permitted to flow through the lateral outlet-port 15. The closure-cap 12 is provided with a protruding pin 26', adapted to form a stop for the handle to limit its movement between A and C, the head of the handle being provided with a flange 27, having a marginal recess 28 of an arc length permitting the handle to move between A and C before the respective ends of the recess contact with the stop pin. The lateral boss 13 has secured thereto a basin-outlet 29 and the vertical boss 14 has secured thereto an outlet 30 adapted to receive a shampoo or a fountain brush attachment, either of which is not shown.

In the modification shown in Figs. 8 and 9, the pedestal 1' has also an integral valve-cage 31 but the axis of its bore 8' is disposed transversely to the axis of the valve mandrel tubes 9' and 10'. The outlet port-bosses 13' and 14' and arranged at opposite sides of the valve bore 8', in the same vertical plane, but are offset relative to the length of the bore 8' which construction necessitates the providing of a duct 32 to the outlet boss 13'. The quadrant port 25' and the port 26' are retained in the valve body 19' which latter is further provided with ports 33 and 34 for the lateral outlet to effect the opening and closing of the respective outlet ports 15' and 16'.

The advantages of my two way valve consists in that the hot and cold water valves may be adjusted to the required temperature of water and the outflow of it controlled by means of my valve 19 and that by providing a two way outlet, one of the outlets may be permanently equipped with a shampoo attachment or a fountain-brush attachment, drainable of its contents after the supply of water is cut off by the moving of my valve into the position B which position also cuts off the outlet of water from the mixing chamber of the fixtures.

What I claim is—

1. In a two-way outlet faucet, a mixing chamber provided with controllable supply pipes respectively for hot and cold water, a valve casing, integral with the mixing chamber, having a side-inlet ported to the mixing chamber and being provided with two diverging outlet ports, one of the outlet ports being nearer to the inlet than the other outlet port, a hollow valve, rotatably housed with the casing having an external handle, and being provided with ports adapted to be brought into communication with the inlet and with the outlet ports respectively, the valve ports differing in length and separated on opposite sides by about equal portions, whereby when the valve is rotated in one direction the nearer outlet port of the casing may be brought into communication with the inlet port and the farther outlet port closed, or, by turning the valve in the opposite direction the nearer outlet port may be closed and the farther outlet port brought into communication with the inlet port, or by placing the valve in an intermediate position the inlet port may be closed and the outlet ports brought into communication.

2. In a two-way outlet faucet, a pedestal having a mixing chamber provided with controllable supply pipes respectively for hot and cold water, a valve casing, integral with the mixing chamber, having a side-inlet ported to the mixing chamber and being provided with two diverging outlet ports one of the outlet ports being nearer to the inlet than the other outlet port, a hollow valve, rotatably housed within the casing, having an external handle and being provided with ports adapted to be brought into communication with the inlet and with the outlet ports respectively the valve ports differing in length and separated on opposite sides by about equal portions, whereby when the valve is rotated in one direction the nearer outlet port of the casing may be brought into communication with the inlet port and the farther outlet port closed, or, by turning the valve in the opposite direction the nearer outlet port may be closed and the farther outlet port brought into communication with the inlet port, or by placing the valve in an intermediate position the inlet port may be closed and the outlet ports brought into communication.

3. In a two-way outlet faucet, a mixing chamber provided with controllable supply pipes respectively for hot and cold water, a valve casing, integral with the mixing chamber, having a side-inlet ported to the mixing chamber and being provided with two diverging outlet ports, one of the outlet ports being nearer to the inlet that the other outlet port, a hollow valve, rotatably housed within the casing, having an external handle and being provided with ports adapted to be brought into communication with the inlet and with the outlet ports respectively, the valve ports differing in length and separated on opposite sides by about equal portions, whereby when the valve is rotated in one direction the nearer outlet port of the casing may be brought into communication with the inlet port and the farther outlet port closed, or, by turning the valve in the opposite direction the nearer outlet port may be closed and the farther outlet port brought into communication with the inlet port, or by placing the valve in an intermediate position the inlet port may be closed and the outlet ports brought into communication and a stop adapted to limit the rotative movement of the valve.

4. In a two-way outlet faucet, a pedestal having a mixing chamber provided with controllable supply pipes respectively for hot and cold water, a valve casing, integral with the mixing chamber, having a side-inlet ported to the mixing chamber and being provided with two diverging outlet ports one of the outlet ports being nearer to the inlet than the other outlet port, a hollow valve, rotatably housed within the casing, having an external handle and being provided with ports adapted to be brought into communication with the inlet and with the outlet ports respectively the valve ports differing in length and separated on opposite sides by about equal portions, whereby when the valve is rotated in one direction the nearer outlet port of the casing may be brought into communication with the inlet port and the farther outlet port closed, or, by turning the valve in the opposite direction the nearer outlet port may be closed and the farther outlet port brought into communication with the inlet port, or by placing the valve in an intermediate position the inlet port may be closed and the outlet ports brought into communication and a stop adapted to limit the rotative movement of the valve.

5. In a two-way outlet faucet, a mixing chamber provided with controllable supply pipes respectively for hot and cold water, a valve casing, integral with the mixing chamber, having a side-inlet ported to the mixing chamber and being provided with two diverging outlet ports, one of the outlet ports being nearer to the inlet than the other outlet port, a hollow valve, rotatably housed within the casing and spring seated and having an external handle, and being provided with ports adapted to be brought into communication with the inlet and with the outlet ports respectively, the valve ports differing in length and separated on opposite sides by about equal portions, whereby when the valve is rotated in one direction the nearer outlet port of the casing may be brought into communication with the inlet port and the farther outlet port closed, or, by turning the valve in the opposite direction the nearer outlet port may be closed and the farther outlet port brought into communication with the inlet port, or by placing the valve in an intermediate position the inlet port may be closed and the outlet ports brought into communication.

6. In a two-way outlet faucet, a mixing chamber provided with controllable supply pipes respectively for hot and cold water, a valve casing, integral wtih the mixing chamber, having a side-inlet ported to the mixing chamber and being provided with two diverging outlet ports one of the outlet ports being nearer to the inlet than the other outlet port, a hollow valve, rotatably housed within the casing. having an external handle and being provided with an inlet port and with an outlet port of a width equal to the portion separating the farther side of the outlet ports, of the valve casing and said valve ports being separated on opposite sides by about equal portions.

In witness whereof, I have hereunto set my hand this 12th day of Dec. 1910.

IRVING W. LITTLE.

Witnesses:
C. R. LEE,
E. M. COONEY.